Dec. 17, 1929.  R. B. CUMMINS  1,740,225
PROTECTOR SWITCH
Filed Dec. 20, 1928
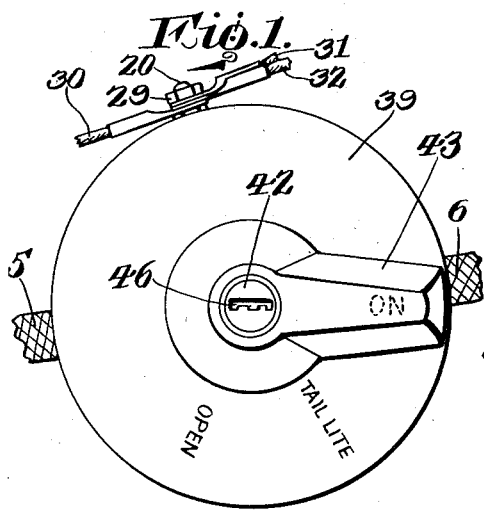
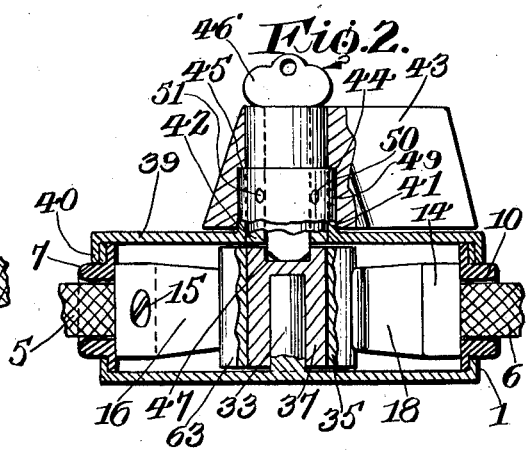
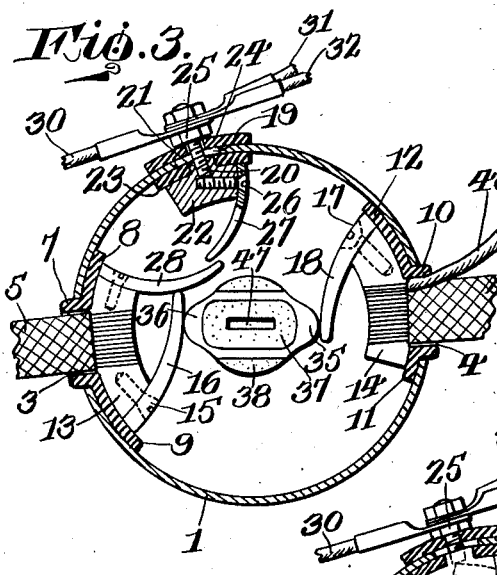
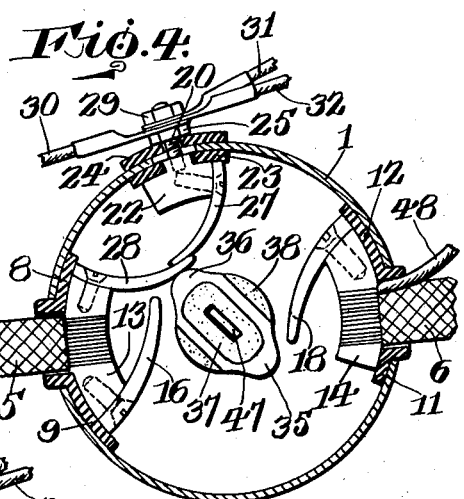
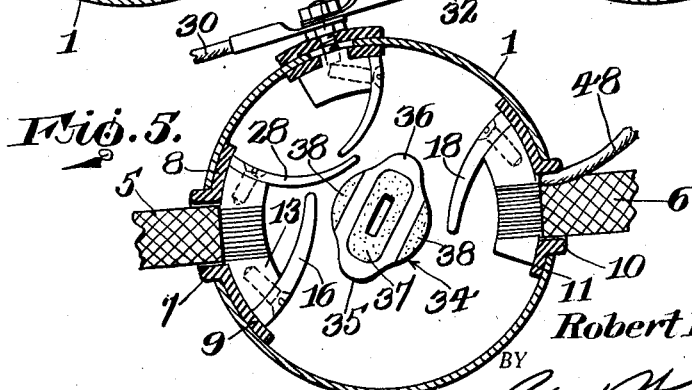
INVENTOR.
Robert B. Cummins,
BY
Geo. P. Kimmel
ATTORNEY.

Patented Dec. 17, 1929

1,740,225

UNITED STATES PATENT OFFICE

ROBERT B. CUMMINS, OF KOKOMO, INDIANA

PROTECTOR SWITCH

Application filed December 20, 1928. Serial No. 327,277.

This invention relates to a protector switch particularly adapted for use in connection with automobiles but adaptable for use in connection with motor boats, aeroplanes, and all other types of motor vehicles wherein ignition is used.

The primary object of this invention is to provide, in a manner as hereinafter set forth, a protector switch for the cable leading from the battery to the starting switch of a motor vehicle, by means of which the flow of electrical energy through the cable may be interrupted when desired, thereby reducing the fire hazard from a short circuit to a minimum degree.

A further object of the invention is to provide a protector switch as aforesaid which may be opened to prevent the passage of current therethrough or which may be closed in selected positions to selectively pass the current to the starting switch or parking light, and which further may be locked in any of the selected position, thereby preventing any possibility of the flow of current being changed except by someone in possession of the key to the switch.

With the foregoing and other objects in view, the invention consists of the novel construction, combination and arrangement of parts as hereinafter more particularly described, and as illustrated in the accompanying drawings wherein is shown a preferred embodiment of the invention, but it is to be understood that such drawings and description are to be taken as illustrative and that the invention is intended to be limited only by the scope of the claims hereunto appended.

In the accompanying drawings in which like numerals are employed to designate like parts throughout the same:—

Figure 1 is a top plan of a protector switch constructed in accordance with this invention.

Figure 2 is a vertical section therethrough.

Figure 3 is a transverse section therethrough, showing the same in operative position to pass the current from a battery to a starting switch.

Figure 4 is a view similar to Figure 3, showing the switch in operative position to pass the current from a battery to a set of parking lights.

Figure 5 is a view similar to Figure 3, showing the switch in open position whereby the current is prevented from passing therethrough.

Referring to the drawings in detail, the numeral 1 designates a casing which is formed with a bottom 2 and which is open at its top. Formed in the casing 1, at diametrically opposite sides thereof, is a pair of openings 3 and 4 through which extends a pair of cables 5 and 6 respectively. The cable 5 is adapted for connection at its outer end with a battery, not shown, and the cable 6 is adapted for connection at its outer end with a starting switch, not shown. Interposed between the cable 5 and the wall of the opening 3 is an annular insulating member 7, which is formed with a pair of oppositely extending arms 8 and 9. The arms 8 and 9 are of arcuate contour in order to seat against the inner face of the casing 1 and the arm 9 is materially longer than the arm 8. Interposed between the cable 6 and the wall of the opening 4 is a similar insulating member 10, which is formed with an arm 11 and an oppositely extending, relatively longer arm 12.

Secured to the inner end of the cable 5 is a primary terminal 13, which is seated against the insulating arms 8 and 9 and which may be secured thereto in any suitable manner. Secured to the inner end of the cable 6 is a secondary terminal 14, which is seated against the insulating arms 11 and 12 and which is adapted to be secured thereto. Secured to one end of the terminal 13, by means of a suitable holdfast device 15, is a resilient, primary contact finger 16 of arcuate contour, having one end abutting against the inner face of the insulating arm 9 and having its other end projecting inwardly with respect to the casing 1. Secured to the terminal 14, by means of a suitable holdfast device 17, is a resilient, secondary contact finger 18, one end of which abuts against the inner face of the insulating arm 12 and the other end of which projects inwardly with respect to the casing 1.

Formed in the casing 1, in spaced relation to the openings 3 and 4, is an opening 19, through which extends a conducting element 20 having its inner end in threaded engagement with the neck 21 of a secondary terminal 22. Interposed between the terminal 22 and the casing 1, and encircling the neck 21, is an annular, insulating washer 23, and encircling the conducting element 20, and bearing against the outer surface of the casing 1, is a similar insulating washer 24. A lock nut 25 is threaded on the outer end of the conducting element 20, which bears against the washer 24 and secures the conducting element 20 and terminal 22 in position.

Secured to the terminal 22, by means of a suitable holdfast device 26, is a resilient, secondary contact finger 27, one end of which abuts against the insulating washer 23 and the other end of which projects inwardly with respect to the casing 1. Secured to the terminal 13, at the opposite end thereof from the contact finger 16, is a primary contact finger 28, one end of which abuts against the inner face of the insulating arm 8 and the other end of which projects inwardly with respect to the casing 1.

The contact fingers 27 and 28 are of arcuate contour and the inner ends thereof are disposed in spaced, overlapping relation.

Secured to the conducting element 20, by means of a suitable nut 29, are the terminal portions of a plurality of wires 30, 31 and 32 respectively. The wire 30 is adapted for connection at its outer end with a tail light for a motor vehicle, not shown, the wire 31 is adapted for connection at its outer end with the cowl lights, not shown, and the wire 32 is adapted for connection with the conventional light switch on instrument boards, not shown.

Extending inwardly from the bottom 2 of the casing is a pin 33, upon which is rotatably mounted a rotary connector element, indicated generally by the numeral 34, and forming a part of a circuit opening and closing means. The element 34 is of elongated formation and is formed at each end with a cam surface to provide a pair of oppositely disposed contact points 35 and 36. The element 34 is of hollow construction and is provided with a central insulating member 37 into which the pin 33 extends, and is further provided with a pair of insulated sides 38.

A cover 39 is provided for the casing 1, which is formed with an annular flange 40 for maintaining the same in position. The cover 39 is formed centrally thereof with an opening, about the wall of which extends an upstanding, annular flange 41. Extending into the interior of the flange 41 is a locking member 42, which has a shifting lever 43 formed integral with its outer end. The lever 43 is formed in its lower surface with a recess 44 into which the flange 41 projects. The lever 43 is maintained in spaced relation to the cover 39 by means of a shoulder 45, which is formed at the upper end of the recess 44 and which seats on the upper end of the flange 41.

Extending longitudinally through the locking member 42 is a key slot 46, which is adapted to have a key 46 extended therethrough and into a recess 47 formed in the upper surface of the insulating member 37.

When the key is inserted through the slot 46 and into the recess 47, the locking member 42 is operatively connected with the rotary connector element 34 and any rotary movement to the locking member 42 by means of the lever 43 will be imparted to the connector element 34. When the lever 43 is turned to the position illustrated in Figure 1, the connector element 34 will be turned to the position illustrated in Figure 3 and in this position the current from the cable 5 will pass through the terminal 13, contact finger 16, connector element 34, contact finger 18, and terminal 14 to the cable 6 to provide for a supply of electrical energy to the starting switch from the battery. A wire 48 leads from the terminal 14 to the light switch on the instrument board, not shown, in order to provide for a supply of current through the wires 32 and 30 to the tail light if desired, with the connector element 34 in the position illustrated in Figure 3.

When the connector element 34 is turned to the position illustrated in Figure 4, current is passed through the cable 5, terminal 13, contact fingers 28 and 27, terminal 22, and conducting element 20 to the wires 30 and 31 leading to the tail light and cowl lights respectively.

When the connector element 34 is turned to the position illustrated in Figure 5, the switch is open and the current from the cable 5 cannot pass beyond the fingers 16 and 28.

The locking member 42 may be of any well known construction for coaction with a set of openings, 49, 50 and 51 formed in the flange 41 for locking the member 42 against rotation after the lever 43 has been adjusted to shift the element 34 to its selected position, as the positions of the openings 49, 50 and 51 correspond to the adjusted positions of the lever.

The cover 39 may have inscribed on its upper face suitable inscription, such as "On", "Taillite", and "Open". When the lever 43 is turned to one of the inscriptions on the upper face of the cover, the connector element 34 will be turned to a corresponding position within the casing.

It is thought the many advantages of a protector switch in accordance with this invention will be readily apparent, and although the preferred embodiment is as illustrated and described, yet it is to be understood that various changes in the details of construction may be made, which fall within the scope of the invention as defined in the appended claims.

What I claim is:

1. In a protector switch, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, and a rotatable circuit opening and closing member for selectively engaging the overlapping primary and secondary contact fingers with each other and operatively connecting the other primary contact finger with the other secondary contact finger.

2. In a protector switch, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, a rotatable circuit opening and closing member for selectively engaging the overlapping primary and secondary contact fingers with each other and operatively connecting the other primary contact finger with the other secondary contact finger, a rotatable operating means for said member normally free of connection therewith, and means for connecting said operating means with said member to provide for the rotation of the latter by the former.

3. In a protector switch, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, a rotatable circuit opening and closing member for selectively engaging the overlapping primary and secondary contact fingers with each other and operatively connecting the other primary contact finger with the other secondary contact finger, a rotatable operating means for said member normally free of connection therewith, and means for connecting said operating means with said member to provide for the rotation of the latter by the former, said member being of elongated form and having a contact formed at each end thereof.

4. In a protector switch, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, a rotatable circuit opening and closing member for selectively engaging the overlapping primary and secondary contact fingers with each other and operatively connecting the other primary contact finger with the other secondary contact finger, a rotatable operating means for said member normally free of connection therewith, and means for connecting said operating means with said member to provide for the rotation of the latter by the former, said member being of elongated form and having a contact formed at each end thereof, said member further being hollow and provided with a central and a pair of side insulating elements.

5. A protector switch comprising, a casing, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, said contact fingers being disposed within the casing, a pin secured to the casing and projecting inwardly with respect thereto, a circuit opening and closing member mounted on the pin, said member being normally out of contact with said contact fingers and further being rotatable to selectively engage the overlapping primary and secondary contact fingers with each other and operatively connect the other primary contact finger with the other secondary contact finger, a rotatable element for operating said member and normally free of connection therewith, and means for connecting said element and member to provide for the rotation of the latter by the former, said casing being provided with means coacting with said connecting means and element for locking said member in selected positions.

6. A protector switch comprising, a casing, a pair of resilient primary contact fingers of arcuate form for connection to a primary terminal, a pair of spaced, resilient secondary contact fingers of arcuate form, each for connection to a secondary terminal and for association with a primary contact finger, one of said primary contact fingers extending towards its associated secondary contact finger in overlapping, spaced relation thereto, the other of said primary contact fingers opposing its associated secondary contact finger, said contact fingers being disposed within the casing, a pin secured to the casing and projecting inwardly with respect thereto, a circuit opening and closing member mounted on the pin, said member being normally out of contact with said contact fingers and further being rotatable to selectively engage the overlapping primary and secondary contact fingers with each other and operatively connect the other primary contact finger with the other secondary contact finger, a rotatable element for operating said member and normally free of connection therewith, and means for connecting said element and member to provide for the rotation of the latter by the former, said casing being provided with means coacting with said connecting means and element for locking said member in selected positions, said member being of elongated form and having a contact formed at each end thereof, said member further being hollow and provided with a central and a pair of side insulating elements.

7. A protector switch comprising a casing, a primary terminal and a pair of secondary terminals therein, said terminals being spaced from each other, means for insulating the terminals from the casing, a pair of spaced, resilient primary contact fingers secured to the primary terminal, a secondary contact finger secured to each of the secondary terminals, each of said contact fingers having a free end projecting inwardly with respect to the casing, the free ends of one secondary and one primary contact finger being oppositely disposed diametrically of the casing, the free ends of the other secondary and primary contact fingers being disposed in spaced, overlapping relation, and means for selectively engaging said overlapping contact fingers with each other and operatively connecting the other primary contact finger with the other secondary contact finger.

8. A protector switch comprising a casing, a primary terminal and a pair of secondary terminals therein, said terminals being spaced from each other, means for insulating the terminals from the casing, a pair of spaced, resilient primary contact fingers secured to the primary terminal, a secondary contact finger secured to each of the secondary terminals, each of said contact fingers having a free end projecting inwardly with respect to the casing, the free ends of one secondary and one primary contact finger being oppositely disposed diametrically of the casing, the free ends of the other secondary and primary contact fingers being disposed in spaced, overlapping relation, and means for selectively engaging said overlapping contact fingers with each other and operatively connecting the other primary contact finger with the other secondary contact finger, said means including a rotatable circuit opening and closing member having a pair of oppositely disposed contacts, said contacts being normally free of engagement with said contact fingers and engageable therewith upon the rotation of said member.

In testimony whereof, I affix my signature hereto.

ROBERT B. CUMMINS.